(12) United States Patent
Moon et al.

(10) Patent No.: US 8,710,806 B2
(45) Date of Patent: Apr. 29, 2014

(54) APPARATUS AND METHOD FOR DISCHARGING CAPACITOR OF INPUT FILTER OF POWER SUPPLY, AND POWER SUPPLY INCLUDING THE APPARATUS

(75) Inventors: Sang Cheol Moon, Bucheon (KR); Hyun Min Kim, Bucheon (KR); Sung-Won Yun, Seoul (KR); Min-Woo Lee, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 276 days.

(21) Appl. No.: 13/238,565

(22) Filed: Sep. 21, 2011

(65) Prior Publication Data
US 2012/0105016 A1    May 3, 2012

(30) Foreign Application Priority Data
Nov. 1, 2010    (KR) .......................... 10-2010-0107697

(51) Int. Cl.
*H01M 10/44*    (2006.01)
*H01M 10/46*    (2006.01)

(52) U.S. Cl.
USPC .......................................................... 320/166

(58) Field of Classification Search
USPC .......................................... 320/127, 135, 166
See application file for complete search history.

(56) References Cited

U.S. PATENT DOCUMENTS

| | | | | |
|---|---|---|---|---|
| 5,036,284 A | * | 7/1991 | Cichanski | 324/433 |
| 5,523,667 A | * | 6/1996 | Feldstein | 320/118 |
| 6,121,758 A | * | 9/2000 | Bellina et al. | 323/211 |
| 2010/0309694 A1 | | 12/2010 | Huang et al. | |

* cited by examiner

*Primary Examiner* — Edward Tso
(74) *Attorney, Agent, or Firm* — Okamoto & Benedicto LLP (57) ABSTRACT

A power supply includes an input filter and a discharging device. The input filter includes a capacitor to which an AC power source is provided. The discharging device rectifies and samples the AC power source. The discharging device generates a reference voltage according to a peak voltage of a generated sampling signal, generates an AC power source cutoff detection signal according to a comparison signal generated by comparing the sampling signal and a reference voltage, and discharges the capacitor through a discharging resistor according to the AC power source cutoff detection signal.

14 Claims, 8 Drawing Sheets

APPARATUS AND METHOD FOR DISCHARGING CAPACITOR OF INPUT FILTER OF POWER SUPPLY, AND POWER SUPPLY INCLUDING THE APPARATUS

CROSS-REFERENCE TO RELATED APPLICATION

This application claims priority to and the benefit of Korean Patent Application No. 10-2010-0107697 filed in the Korean Intellectual Property Office on Nov. 1, 2010, the entire contents of which are incorporated herein by reference.

BACKGROUND OF THE INVENTION (a) Field of the Invention

The present invention relates to a device and method for discharging a capacitor of an input filter of a power supply. In particular, the present invention relates to a power supply for improving power efficiency and reducing standby power.

(b) Description of the Related Art

Power supplies are widely used in order to provide stable power to computers, home appliances, communication devices, etc. As issues such as environmental pollution and energy resource exhaustion have been recently raised, the efficiency of power supplies grows more important. In particular, standby power of the power supply has been focused on.

Figure 1:
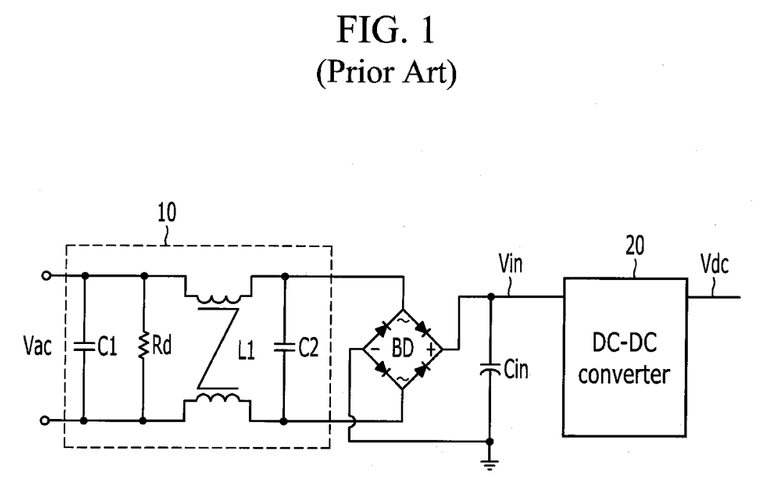
FIG. 1 shows a circuit diagram of a conventional power supply.

FIG. 1 shows a circuit diagram of a conventional power supply.

As shown in FIG. 1, the conventional power supply is provided with an AC power source Vac to generate a regulated DC voltage Vdc, and includes an input filter 10, a bridge diode BD, a capacitor Cin, and a DC-DC converter 20.

The input filter 10 stabilizes the AC power source Vac and reduces electromagnetic interference (EMI), and includes a first input capacitor C1, a discharging resistor Rd, a choke coil L1, and a second input capacitor C2. Two terminals of the first input capacitor C1 are connected to two terminals of the AC power source Vac, respectively. Two terminals of the discharging resistor Rd are also connected to two terminals of the AC power source Vac, respectively. Two input terminals of the choke coil L1 are connected to two terminals of the AC power source Vac, respectively. Two output terminals of the choke coil L1 are connected to two terminals of the second capacitor C2, respectively.

The bridge diode BD is composed of four diodes, and includes two input terminals and two output terminals. The two input terminals of the bridge diode BD are connected to two output terminals of the choke coil L1, respectively. The two output terminals of the bridge diode BD are connected to two terminals of the capacitor Cin, respectively. The bridge diode BD rectifies an EMI-reduced AC power source. The capacitor C1 smooth a rectified AC power source to generated an input voltage Vin of the DC-DC converter 20.

The DC-DC converter 20 converts the input voltage Vin into a regulated DC voltage Vdc.

Because the first input capacitor C1 and the second input capacitor C2 are charged by a high voltage, discharge of the first input capacitor C1 and the second input capacitor C2 is required when supply of the AC power source Vac stops.

For this purpose, the prior power supply has the discharging resistor Rd to discharge the first input capacitor C1 and the second input capacitor C2. However, since the discharging resistor Rd continues to be provided with the AC power source Vac, it reduces efficiency of the power supply. Also, in case of no load, the discharging resistor Rd causes large standby power.

Moreover, as the size of the first input capacitor C1 is larger, the size of the second input capacitor C2 is larger, or the discharge speed is more rapid, the size of the discharging resistor Rd is required to be small, so it causes lower efficiency of the power supply.

SUMMARY OF THE INVENTION

Embodiments of the present invention provide a device and method for discharging a capacitor of an input filter of a power supply, and a power supply having advantages of reducing standby power and improving efficiency.

An embodiment of the present invention provides a device for discharging a first capacitor of an input filter of a power supply, including: a rectifier for rectifying an AC power source to generate a rectified AC signal; a sampler for sampling the rectified AC signal to generate a sampling signal; a reference voltage generator for generating a reference voltage according to a peak voltage of the sampling signal; a first comparator for comparing the sampling signal and the reference voltage to generate a comparison signal; a power source cutoff detector for generating a cutoff detection signal of the AC power source according to the comparison signal; and a first discharging resistor for discharging the first capacitor according to the cutoff detection signal.

The reference voltage generator may divide the peak voltage by a predetermined ratio to generate the reference voltage.

The predetermined ratio may correspond to the sine of 45°, and the sampler may sample the rectified AC signal with a sampling period corresponding to a quarter of a period of the AC power source.

The power source cutoff detector may further includes: a shift register for storing N comparison signals; and a gate unit for outputting a power source cutoff signal for notifying cutoff of the AC power source if all of the N comparison signals have the same value.

The gate unit may further include: an AND gate whose inputs are the N comparison signals; a NOR gate of which inputs are the N comparison signals; and an OR gate for outputting the power source cutoff signal, the OR gate having an output of the AND gate and an output of the NOR gate as input.

The device may further include a second discharging resistor having one terminal to which the rectified AC signal is provided.

The sampler may include: a high voltage switch having a drain electrode connected to the other terminal of the second discharging resistor; an OR gate of which inputs are a clock signal and the power source cutoff signal; and a first transistor having a drain electrode connected to a source electrode of the high voltage switch, a gate electrode connected to an output of the OR gate, and a source electrode that is connected to one terminal of the second discharging resistor and outputs the sampling signal.

The sampler may further include: a second transistor having a source electrode connected to the source electrode of the high voltage switch and a drain electrode connected to a gate electrode of the high voltage switch; a third transistor having a drain electrode connected to the drain electrode of the second transistor and a source electrode connected to ground; a fourth transistor having a drain electrode connected to the source electrode of the high voltage switch and a gate electrode connected to the drain electrode of the second transistor; a fifth transistor having a drain electrode connected to the source electrode of the high voltage switch and a gate electrode connected to the drain electrode of the second transistor; a diode having an anode connected to a source electrode of the fourth transistor; a resistor having one terminal connected to a source electrode of the fifth transistor; a second capacitor having one terminal connected to both the other terminal of the resistor and a cathode of the diode and the other terminal connected to ground; and a second comparator of which inputs are the one terminal of the second capacitor and a reference voltage for an operating voltage, the second comparator having an output terminal connected to both a gate electrode of the second transistor and a gate electrode of the third transistor.

Another embodiment of the present invention provides a method for discharging a capacitor an input filter of a power supply, including: rectifying an AC power source to generate a rectified AC signal; sampling the rectified AC signal according to a clock signal to generate a sampling signal; generating a reference voltage that varies according to a peak voltage of the sampling signal; comparing the sampling signal with the reference voltage to generate the comparison signal; generating a cutoff detection signal of the AC power source according to the comparison signal; and discharging the capacitor through a discharging resistor according to the cutoff detection signal.

Generating the reference voltage may include: dividing the peak voltage by a predetermined ratio to generate the reference voltage.

The predetermined ratio may correspond to the sine of 45°, and a period of the clock signal may correspond to a quarter of a period of the AC power source.

Generating the cutoff detection signal may include outputting the cutoff detection signal for notifying a cutoff of the AC power source if all of N comparison signals have the same value.

Yet another embodiment of the present invention provides a power supply, including: an input filter having a capacitor provided with an AC power source; and a discharging device for generating a reference voltage according to a peak voltage of a sampling signal generated by rectifying and sampling the AC power source, generating a cutoff detection signal of the AC power source according to a comparison signal generated by comparing the sampling signal with the reference voltage, and discharging the capacitor through a discharging resistor according to the cutoff detection signal.

The discharging device may divide the peak voltage by a predetermined ratio to generate the reference voltage.

The predetermined ratio may correspond to the sine of 45°, and the discharging device may sample a rectified AC signal with a sampling period corresponding to a quarter of a period of the AC power source.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

In addition, unless explicitly described to the contrary, the word "comprise" and variations such as "comprises" or "comprising" will be understood to imply the inclusion of stated elements but not the exclusion of any other elements.

Figure 2:
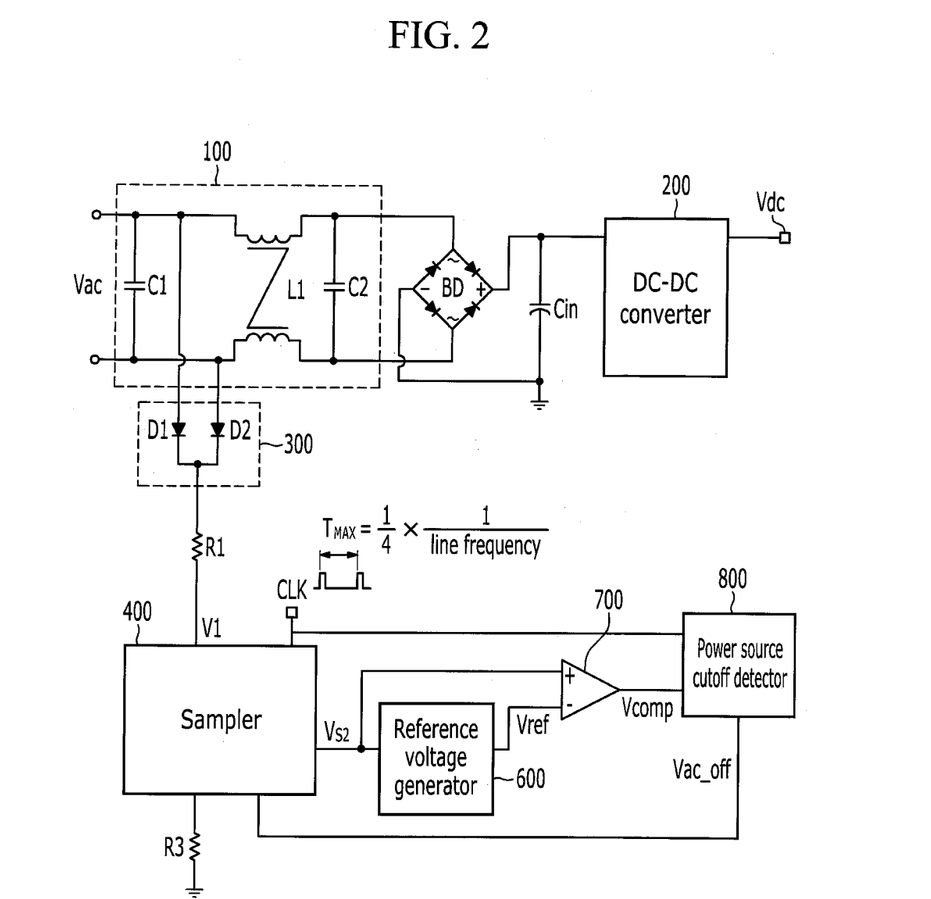
FIG. 2 shows a circuit diagram of a power supply according to an embodiment of the present invention.

FIG. 2 shows a circuit diagram of a power supply according to an embodiment of the present invention.

As shown in FIG. 2, a power supply according to an embodiment of the present invention includes an input filter 100, a bridge diode BD, a capacitor Cin, a DC-DC converter 200, a rectifier 300, a first discharging resistor R1, a sampler 400, a reference voltage generator 600, a comparator 700, a power source cutoff detector 800, and a second discharging resistor R3.

The input filter 100 according to an embodiment of the present invention is the same as the input filter 10 of FIG. 1 except for the discharging resistor Rd of the input filter 10 in FIG. 1. For better comprehension and ease of description, the input filter 100 of FIG. 2 is referred to, but it is not essential to use the input filter 100 of FIG. 2 in order to work the present invention. The present invention can be applied to a power supply including a capacitor that is connected to the AC power source Vac and requires discharge.

Because the constitution and operation of an input filter 100, a bridge diode BD, a capacitor Cin, and a DC-DC converter 200 of the power supply according to an embodiment of the present invention are similar to those of FIG. 1, their descriptions will be omitted.

Inputs of the rectifier 300 are two terminals of the AC power source Vac, and the rectifier 300 generates a rectified AC signal V1. The sampler 400 samples the rectified AC signal V1 according to a period Tsampling of a clock signal CLK to generate a second sampling signal $V_{S2}$. The reference voltage generator 600 generates a reference voltage Vref from the second sampling signal $V_{S2}$, and the comparator 700 compares the second sampling signal $V_{S2}$ with the reference voltage Vref to output a comparison signal Vcomp. The power source cutoff detector 800 checks, from the comparison signal Vcomp, whether the AC power source Vac is cut off to output a power source cutoff signal Vac_off. If the AC power source Vac is cut off, the first input capacitor C1 and the second input capacitor C2 are discharged by the second discharging resistor R3.

Concretely, the rectifier 300 according to an embodiment of the present invention includes the first diode D1 and the second diode D2. An anode of the first diode D1 and an anode of the second diode D2 are connected to two terminals of the AC power source Vac, respectively. Both a cathode of the first diode D1 and a cathode of the second diode D2 are connected to one terminal of the first discharging resistor R1. According to the above-described constitution, the other terminal of the first discharging resistor R1 outputs the rectified AC signal V1.

Next, referring to FIG. 3, the sampler 400 according to an embodiment of the present invention will be described.

Figure 3:
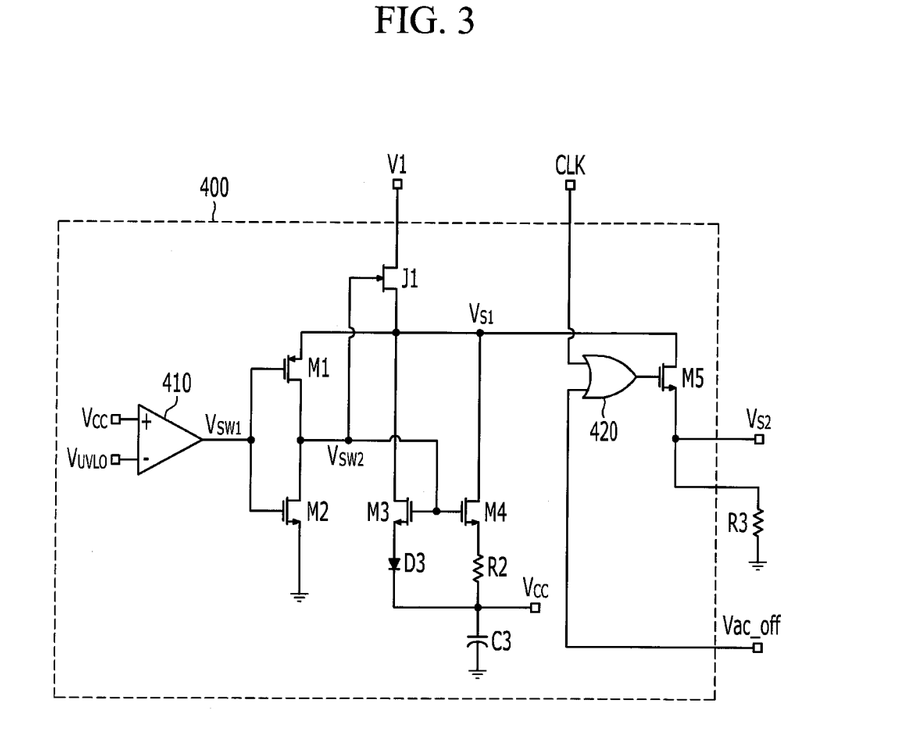
FIG. 3 shows a circuit diagram of a sampler according to an embodiment of the present invention.

FIG. 3 shows a circuit diagram of a sampler according to an embodiment of the present invention.

As shown in FIG. 3, the sampler 400 according to an embodiment of the present invention includes a high voltage switch J1, a first transistor M1, a second transistor M2, a third transistor M3, a fourth transistor M4, a diode D3, a resistor R2, a capacitor C3, a comparator 410, an OR gate 420, and a fifth transistor M5.

The high voltage switch J1 formed by a junction field effect transistor (JFET) has a drain electrode connected to the other terminal of the first discharging resistor R1, and a source electrode providing a first sampling signal $V_{S1}$. The first transistor M1 has a source electrode connected to the source electrode of the high voltage switch J1, and a drain electrode connected to a gate electrode of the high voltage switch J1. The second transistor M2 has a drain electrode that is connected to the drain electrode of the first transistor M1 and provides the second switch signal $V_{SW2}$, a gate electrode connected to a gate electrode of the first transistor M1, and a source electrode connected to ground. The third transistor M3 has a drain electrode connected to the source electrode of the high voltage switch J1, and a gate electrode connected to the gate electrode of the high voltage switch J1. The fourth transistor M4 has a drain electrode connected to the source electrode of the high voltage switch J1, and a gate electrode connected to the gate electrode of the high voltage switch J1. The diode D3 has an anode connected to a source electrode of the third transistor M3, and a cathode connected to one terminal of the capacitor C3. The resistor R2 has one terminal connected to a source electrode of the fourth transistor M4, and the other terminal connected to the one terminal of the capacitor C3. The capacitor has one terminal that is connected to the cathode of the diode D3 and the other terminal of the resistor R2 and provides an operating voltage Vcc, and the other terminal connected to ground. The comparator 410 has a non-inverted terminal (+) connected to the operating voltage Vcc, an inverted terminal (−) connected to a reference voltage $V_{UVLO}$, and an output terminal outputting the first switch signal $V_{SW1}$. The reference voltage $V_{UVLO}$ may correspond to an under-voltage lockout voltage. The OR gate 420 has a first input terminal connected to the clock signal CLK, and a second input terminal connected to the power source cutoff signal Vac_off. The fifth transistor M5 has a drain electrode connected to the first sampling signal $V_{S1}$, a gate electrode connected to an output terminal of the OR gate 420, and a source electrode connected to the second discharging resistor R3 and that provides the second sampling signal $V_{S2}$.

Next, referring to FIG. 4, the reference voltage generator 600 according to an embodiment of the present invention will be described.

Figure 4:
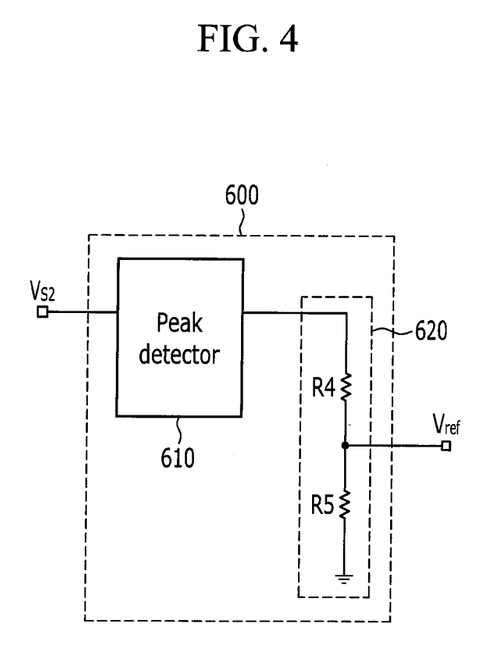
FIG. 4 shows a circuit diagram of a reference voltage generator according to an embodiment of the present invention.

FIG. 4 shows a circuit diagram of a reference voltage generator according to an embodiment of the present invention.

As shown in FIG. 4, the reference voltage generator 600 according to an embodiment of the present invention includes a peak detector 610 and a voltage divider 620. The peak detector 610 detects and outputs a peak $V_{S2\_PEAK}$ of the second sampling signal $V_{S2}$. The voltage divider 620 according to an embodiment of the present invention consists of two serial resistors R4 and R5, and divides an output voltage of the peak detector 610 to output the reference voltage Vref.

Again referring to FIG. 2, the comparator 700 according to an embodiment of the present invention will be described.

The comparator 700 according to an embodiment of the present invention has a non-inverted terminal (+) connected to the second sampling signal $V_{S2}$, an inverted terminal (−) connected to the reference voltage Vref, and an output terminal outputting the comparison signal Vcomp.

Next, referring to FIG. 5, the power source cutoff detector 800 according to an embodiment of the present invention will be described.

Figure 5:
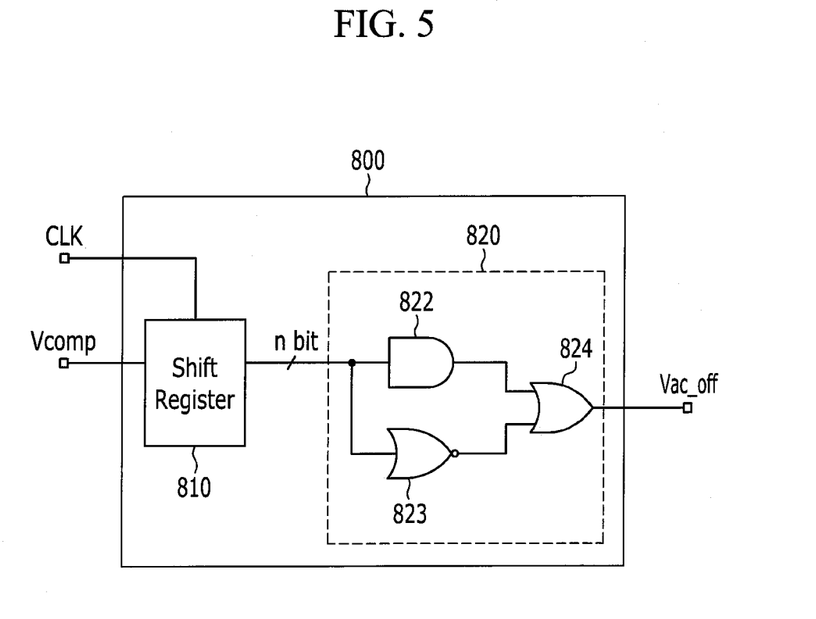
FIG. 5 shows a circuit diagram of a power source cutoff detector according to an embodiment of the present invention.

FIG. 5 shows a circuit diagram of a power source cutoff detector according to an embodiment of the present invention.

As shown in FIG. 5, the power source cutoff detector 800 according to an embodiment of the present invention includes a shift register 810 and a gate unit 820. The gate unit 820 includes an AND gate 822, a NOR gate 823 and an OR gate 824.

The shift register 810 according to an embodiment of the present invention corresponds to n-bit shift register (n is an integer), and it shifts n bits by 1 bit every clock signal with the comparison signal Vcomp as input, and outputs n stored bits. The gate unit 820 outputs the power source cutoff signal Vac_off with a high level when all n bits stored in the shift register 810 have the same values. Concretely, the AND gate 822 performs an AND operation with n output bits of the shift register 810 as input, and outputs an operation result. The NOR gate 823 performs a NOR operation with n output bits of the shift register 810 to output an operation result. The OR gate 824 performs an OR operation with the operation result of the AND gate 822 and the operation result of the NOR gate 823 as inputs, and outputs the power source cutoff signal Vac_off.

Next, referring to waveforms represented in FIGS. 6 to 8, operation of the power supply according to an embodiment of the present invention will be described.

Figure 6:
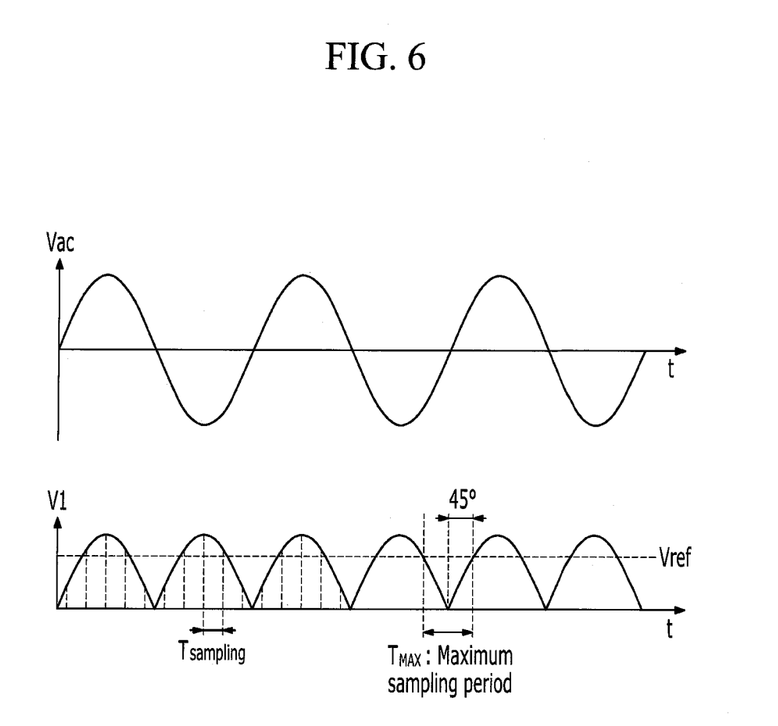
FIG. 6 is a waveform diagram representing an AC power source and a rectified AC signal according to an embodiment of the present invention.

FIG. 6 is a waveform diagram representing an AC power source and a rectified AC signal according to an embodiment of the present invention.

A voltage signal with a sine waveform as shown in FIG. 6 is provided as the AC power source Vac.

First, if the AC power source Vac is turned on, the rectifier 300 rectifies the AC signal Vac, and the first discharging resistor R1 outputs the rectified AC signal V1 as shown in FIG. 6. The drain electrode of the high voltage switch J1 receiving this rectified AC signal V1 is immediately turned on. The source electrode of the high voltage switch J1 outputs the rectified AC signal V1 as the first sampling signal $V_{S1}$. Immediately after the AC power source Vac is turned on, the capacitor C3 is not sufficiently charged, so the operating voltage Vcc is lower than the reference voltage $V_{UVLO}$. Therefore, the comparator 410 outputs the first switch signal $V_{SW1}$ with a low level. Because of this, the first transistor M1 is turned on and the second transistor M2 is turned off. As the first transistor M1 is turned on, the high voltage switch J1 is turned on so the first sampling signal $V_{S1}$ has a high voltage. Because the second switch signal $V_{SW2}$ is the same as the first sampling signal $V_{S1}$, the third transistor M3 and the fourth transistor M4 are turned on. The third transistor M3 and the fourth transistor M4 provide a charging current to the capacitor C3 through the diode D3 and the resistor R2, respectively.

In a case that the operating voltage Vcc reaches the reference voltage $V_{UVLO}$, the comparator 410 outputs a high level, the first transistor M1 is turned off, and the second transistor M2 is turned on. Because the second switch signal $V_{SW2}$ has a low level, the third transistor M3 and the fourth transistor M4 are turned off, and charging of the capacitor C3 is stopped. On the other hand, because the gate electrode of the high voltage switch J1 is provided with a low level, a source-gate voltage of the high voltage switch J1 is higher than a threshold value for a short period, and the high voltage switch J1 is turned off.

In a case that the clock signal CLK corresponds to the high level, the OR gate 420 outputs a high-level signal to a gate electrode of the fifth transistor M5, so the fifth transistor M5 is turned on. Due to a voltage drop in the second discharging resistor R3, the source-gate voltage of the high voltage switch J1 is lower than the threshold value, and the high voltage switch J1 is turned on. That is, the high voltage switch J1 is turned on, when the AC power source Vac is normal, the power source cutoff signal Vac_off corresponds to the low level, and the clock signal CLK corresponds to the high level. On the other hand, the high voltage switch J1 is turned off, when the AC power source Vac is normal, the power source cutoff signal Vac_off corresponds to the low level, and the clock signal CLK corresponds to the low level. Through such operation of the high voltage switch J1, the rectified AC signal V1 is sampled according to the period Tsampling of the clock signal CLK, and the source electrode of the high voltage switch J1 outputs the first sampling signal $V_{S1}$. Also, through the turn-on operation of the fifth transistor M5, the first sampling signal $V_{S1}$ is delivered to the second sampling signal $V_{S2}$.

The peak detector 610 detects and outputs the peak $V_{S2\_PEAK}$ of the second sampling signal $V_{S2}$. The voltage divider 620 divides an output voltage of the peak detector 610 as shown in the following Equation 1 to output the reference voltage Vref.

$$Vref = V_{S2\_PEAK} \times \frac{R5}{R4 + R5} \quad \text{(Equation 1)}$$

The comparator 700 compares the second sampling signal $V_{S2}$ with the reference voltage Vref. If the second sampling signal $V_{S2}$ is higher than the reference voltage Vref, the comparator 700 outputs the comparison signal Vcomp with the high level. If the second sampling signal $V_{S2}$ is lower than the reference voltage Vref, the comparator 700 outputs the comparison signal Vcomp outputs the comparison signal Vcomp with the low level.

As shown in FIG. 6, if the reference voltage Vref and the period Tsampling of the clock signal CLK are appropriately adjusted, the comparison signal Vcomp neither continually has a high level nor continually has a low level when the AC power source Vac is normal. The shorter the period Tsampling of the clock signal CLK is, the shorter a turn-on period of the high voltage switch J1 is. Therefore, the first discharging resistor R1 and the second discharging resistor R2 increase power consumption. Because an embodiment of the present invention varies the reference voltage Vref according to the peak $V_{S2\_PEAK}$ of the second sampling signal $V_{S2}$, power consumption can be minimized.

Next, referring to FIG. 7, an embodiment of the present invention for appropriately adjusting the reference voltage Vref and the period Tsampling of the clock signal CLK to minimize power consumption will be described.

Figure 7:
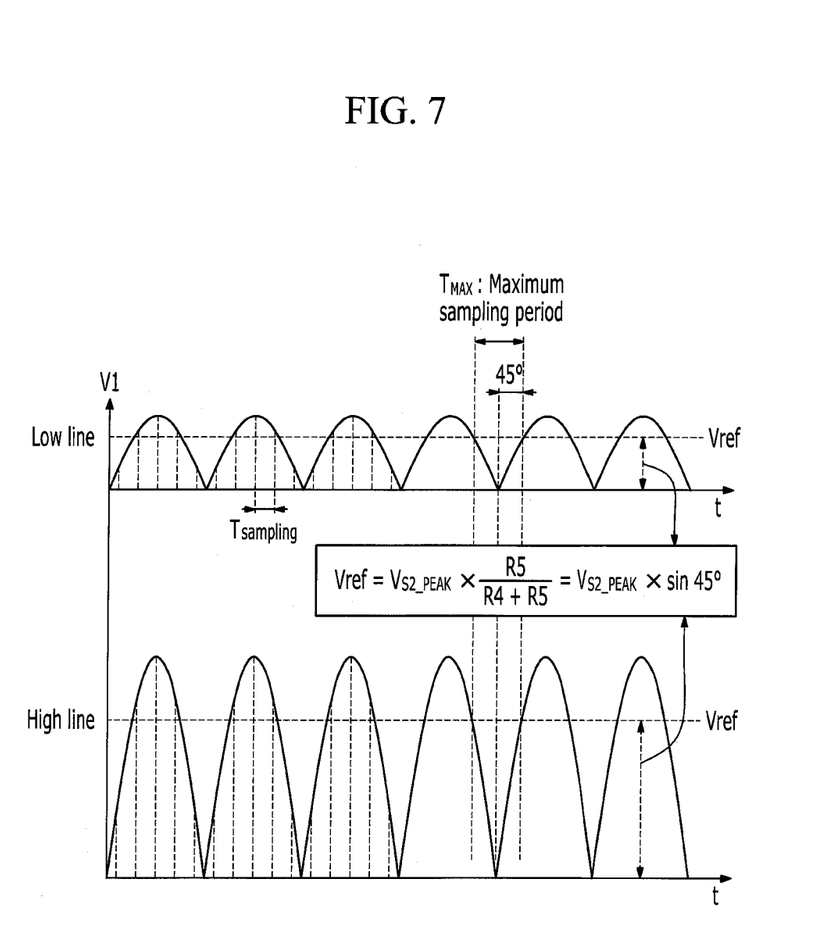
FIG. 7 is a waveform diagram representing a rectified AC signal and the second sampling signal according to an embodiment of the present invention.

FIG. 7 is a waveform diagram representing a rectified AC signal and the second sampling signal according to an embodiment of the present invention.

In FIG. 7, solid lines represent the rectified AC signal V1, and broken lines represent the second sampling signal $V_{S2}$ and the reference voltage Vref.

As shown in FIG. 7, as the level of the AC voltage Vac varies, the level of the rectified AC signal V1 varies. If the reference voltage Vref is determined according to the following Equation 2, the period Tsampling of the clock signal CLK can be expanded up to the maximum value $T_{MAX}$ shown in Equation 3.

$$Vref = V_{S2\_PEAK} \times \frac{R5}{R4 + R5} = V_{S2\_PEAK} \times \sin(45°) \quad \text{(Equation 2)}$$

$$T_{MAX} = \frac{1}{4} \times \frac{1}{\text{AC POWER SOURCE FREQUENCY}} \quad \text{(Equation 3)}$$

Next, referring to FIG. 8, the power source cutoff detector 800 according to an embodiment of the present invention will be described.

Figure 8:
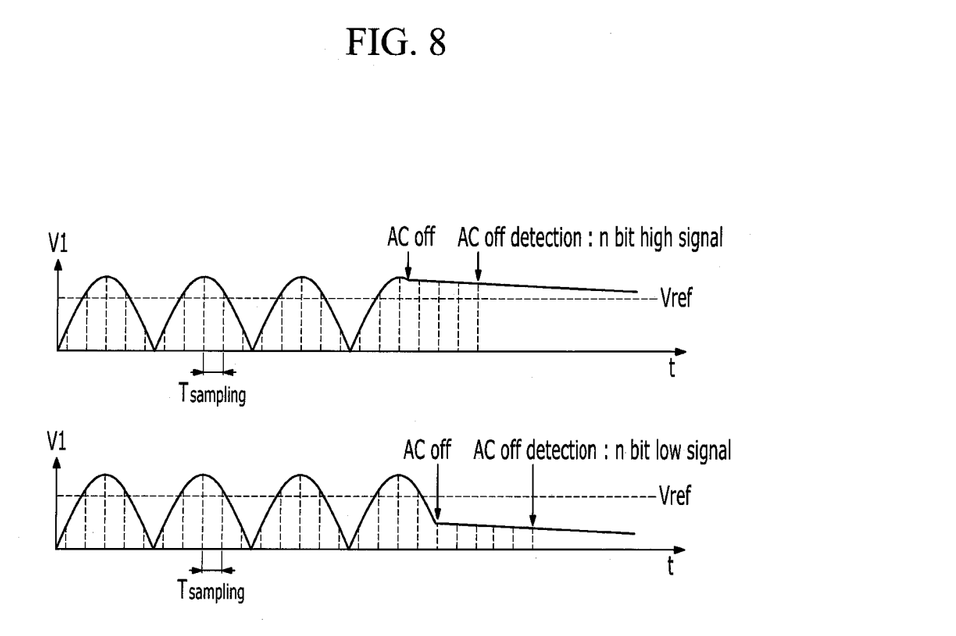
FIG. 8 is a waveform diagram representing a rectified AC signal and the second sampling signal when an AC power source is cut off.

FIG. 8 is a waveform diagram representing a rectified AC signal and the second sampling signal when an AC power source is cut off.

In FIG. 8, solid lines represent the rectified AC signal V1, and broken lines represent the second sampling signal $V_{S2}$ and the reference voltage Vref.

As shown in FIG. 8, in a case that the AC power source Vac is shut off, the rectified AC signal V1 gradually discharges, and from this, the second sampling signal $V_{S2}$ also gradually discharges. Depending on cutoff timing of the AC power source Vac, the second sampling signal $V_{S2}$ continually maintains a higher level than the reference voltage Vref (see upper graph of FIG. 8), or continually maintains a lower level than the reference voltage Vref (see lower graph of FIG. 8). After all, in a case that the comparison signal Vcomp maintains the same level (the higher level or the lower level) during $n*T_{MAX}$, the power source cutoff detector 800 can detect cutoff of the AC power source Vac, so it outputs the power source cutoff signal Vac_off with the high level.

Concretely, the shift register 810 can correspond to an n-bit shift register. The shift register 810 shifts n bits by 1 bit every clock signal with the comparison signal Vcomp as input, and outputs n stored bits. In a case that all n bits stored in the shift register 810 have the same value, the gate unit 820 outputs the power source cutoff signal Vac_off with the high level. The AND gate 822 performs an AND operation with outputs of n bits of the shift register 810 as input to output an operation result. The NOR gate 823 performs a NOR operation with outputs of n bits of the shift register 810 to output an operation result. The OR gate 824 performs an OR operation with the operation result of the AND gate 822 and the operation result of the NOR gate 823 as inputs to output the power source cutoff signal Vac_off.

In a case that the power source cutoff signal Vac_off corresponds to a high level, the OR gate 420 always provides a high-level signal to a gate electrode of the fifth transistor M5 regardless of a level of the clock signal CLK, so the fifth transistor M5 is turned on regardless of the level of the clock signal CLK. Due to voltage drop in the second discharging resistor R3, the source-gate voltage of the high voltage switch J1 is lower than the threshold value, and the high voltage switch J1 is turned on. Due to turn-on of the fifth transistor M5 and the high voltage switch J1, the first input capacitor C1 and the second input capacitor C2 are discharged through the first discharging resistor R1 and the second discharging resistor R3.

According to aspects of the embodiments of the present invention, it is possible to lengthen the sampling period even if the level of an input AC power source varies. Therefore, it is possible to improve efficiency of the power supply and reduce standby power.

The embodiments of the present invention are not implemented only by a device and/or method, but can be implemented through a program for realizing functions corresponding to the configuration of the embodiments of the present invention and a recording medium having the program recorded thereon. These implementations can be realized by the ordinarily skilled person in the art from the description of the above-described embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A device for discharging a first capacitor of an input filter of a power supply, comprising:
    a rectifier for rectifying an AC power source to generate a rectified AC signal;
    a sampler for sampling the rectified AC signal to generate a sampling signal;
    a reference voltage generator for generating a reference voltage according to a peak voltage of the sampling signal;
    a first comparator for comparing the sampling signal and the reference voltage to generate a comparison signal;
    a power source cutoff detector for generating a cutoff detection signal of the AC power source according to the comparison signal; and
    a first discharging resistor for discharging the first capacitor according to the cutoff detection signal.

2. The device of claim 1, wherein the reference voltage generator divides the peak voltage by a predetermined ratio to generate the reference voltage.

3. The device of claim 2, wherein the predetermined ratio corresponds to the sine of 45°, and
    the sampler samples the rectified AC signal with a sampling period corresponding to a quarter of a period of the AC power source.

4. The device of claim 1, wherein the power source cutoff detector further comprises:
    a shift register for storing N comparison signals; and
    a gate unit for outputting a power source cutoff signal for notifying cutoff of the AC power source if all of the N comparison signals have the same value.

5. The device of claim 4, wherein the gate unit further comprises:
    an AND gate whose inputs are the N comparison signals;
    a NOR gate of which inputs are the N comparison signals; and
    an OR gate for outputting the power source cutoff signal, the OR gate having an output of the AND gate and an output of the NOR gate as input.

6. The device of claim 1, further comprising
    a second discharging resistor having one terminal to which the rectified AC signal is provided,
    wherein the sampler comprises:
    a high voltage switch having a drain electrode connected to the other terminal of the second discharging resistor;
    an OR gate of which inputs are a clock signal and the power source cutoff signal; and
    a first transistor having a drain electrode connected to a source electrode of the high voltage switch, a gate electrode connected to an output of the OR gate, and a source electrode that is connected to one terminal of the second discharging resistor and outputs the sampling signal.

7. The device of claim 6, wherein the sampler further comprises:
    a second transistor having a source electrode connected to the source electrode of the high voltage switch and a drain electrode connected to a gate electrode of the high voltage switch;
    a third transistor having a drain electrode connected to the drain electrode of the second transistor and a source electrode connected to ground;
    a fourth transistor having a drain electrode connected to the source electrode of the high voltage switch and a gate electrode connected to the drain electrode of the second transistor;
    a fifth transistor having a drain electrode connected to the source electrode of the high voltage switch and a gate electrode connected to the drain electrode of the second transistor;
    a diode having an anode connected to a source electrode of the fourth transistor;
    a resistor having one terminal connected to a source electrode of the fifth transistor;
    a second capacitor having one terminal connected to both the other terminal of the resistor and a cathode of the diode and the other terminal connected to ground; and
    a second comparator of which inputs are the one terminal of the second capacitor and a reference voltage for an operating voltage, the second comparator having an output terminal connected to both a gate electrode of the second transistor and a gate electrode of the third transistor.

8. A method for discharging a capacitor an input filter of a power supply, comprising:
    rectifying an AC power source to generate a rectified AC signal;
    sampling the rectified AC signal according to a clock signal to generate a sampling signal;
    generating a reference voltage that varies according to a peak voltage of the sampling signal;
    comparing the sampling signal with the reference voltage to generate the comparison signal;
    generating a cutoff detection signal of the AC power source according to the comparison signal; and
    discharging the capacitor through a discharging resistor according to the cutoff detection signal.

9. The method of claim 8, wherein generating the reference voltage comprises:
    dividing the peak voltage by a predetermined ratio to generate the reference voltage.

10. The method of claim 9, wherein the predetermined ratio corresponds to the sine of 45°, and
    a period of the clock signal corresponds to a quarter of a period of the AC power source.

11. The method of claim 10, wherein generating the cutoff detection signal comprises
    outputting the cutoff detection signal for notifying a cutoff of the AC power source if all of N comparison signals have the same value.

12. A power supply, comprising:
an input filter having a capacitor provided with an AC power source; and
a discharging device for generating a reference voltage according to a peak voltage of a sampling signal generated by rectifying and sampling the AC power source, generating a cutoff detection signal of the AC power source according to a comparison signal generated by comparing the sampling signal with the reference voltage, and discharging the capacitor through a discharging resistor according to the cutoff detection signal.

13. The power supply of claim 12, wherein the discharging device divides the peak voltage by a predetermined ratio to generate the reference voltage.

14. The power supply of claim 13, wherein the predetermined ratio corresponds to the sine of 45°, and
the discharging device samples a rectified AC signal with a sampling period corresponding to a quarter of a period of the AC power source.

\* \* \* \* \*